(12) United States Patent
Krewald

(10) Patent No.: US 6,418,650 B1
(45) Date of Patent: Jul. 16, 2002

(54) MESSAGE INSERT FOR A TRAILER HITCH RECEIVER

(76) Inventor: Matthew E. Krewald, 628 Michigan Ave., West Bend, WI (US) 53095

( * ) Notice: Subject to any disclaimer, the term of this patent is extended or adjusted under 35 U.S.C. 154(b) by 0 days.

(21) Appl. No.: 09/614,370

(22) Filed: Jul. 12, 2000

(51) Int. Cl.$^7$ ................................................. B60D 7/00
(52) U.S. Cl. ...................................................... 40/591
(58) Field of Search ........................... 40/540, 591, 658, 40/1.5

(56) References Cited

U.S. PATENT DOCUMENTS

| | | | | |
|---|---|---|---|---|
| 1,876,405 A | * | 9/1932 | Enscott | 40/591 |
| 4,055,013 A | * | 10/1977 | Shields | 40/591 |
| 4,526,820 A | * | 7/1985 | Haas | 40/591 |
| 5,603,178 A | | 2/1997 | Morrison | 40/591 |
| D415,457 S | | 10/1999 | Young et al. | D12/162 |
| D419,505 S | | 1/2000 | Deerman | D12/162 |

* cited by examiner

Primary Examiner—Matthew C Graham
(74) Attorney, Agent, or Firm—Donald J. Ersler

(57) ABSTRACT

A message insert includes an insert retainer and a set of alpha numeric characters. The message insert is preferably fabricated from a plastic molding. The insert retainer is preferably fabricated from a rectangular tube. The insert retainer is long enough to allow a cross bore to be formed in an end thereof. The cross bore allows a retention pin to be inserted through the trailer hitch receiver and the insert retainer to retain the message insert relative to the trailer hitch receiver. At least one edge of each alphanumeric character is joined to an adjacent alphanumeric character to form the message. A front of the insert retainer is joined to a rear of at least one alphanumeric character of the message. The front of the insert may or may not be covered.

12 Claims, 4 Drawing Sheets

MESSAGE INSERT FOR A TRAILER HITCH RECEIVER

BACKGROUND OF THE INVENTION

1. Field of the Invention

The present invention relates generally to inserts for trailer hitch receivers and more specifically to a message insert for a trailer hitch receiver which displays alphanumeric characters without thereof being supported by a back plate or support surface.

2. Discussion of the Prior Art

Currently, there are numerous inserts for trailer hitch receivers. Some these inserts include U.S. Pat. No. 5,603,178 to Morrison, U.S. Pat. No. Des. 415,457 to Young, et al., and U.S. Pat. No. Des. 419,505 to Deerman. In particular, Morrison discloses an insert with a message. However, the message is supported by a back plate.

Accordingly, there is a clearly felt need in the art for a message insert for a trailer hitch receiver which connects adjacent alphanumeric characters to each other on at least one edge thereof instead mounting the alphanumeric characters to a back plate or support surface.

SUMMARY OF THE INVENTION

The present invention provides a message insert for a trailer hitch receiver which does not require a back plate or support surface to display a unique message. The message insert includes an insert retainer and a set of alphanumeric characters (or message). The message insert is preferably fabricated from a single plastic molding. The insert retainer is preferably fabricated from a rectangular tube. The insert retainer is long enough to allow a cross bore to be formed in an end thereof. The cross bore allows a retention pin to be inserted through the trailer hitch receiver and the insert retainer to retain the message insert relative to the trailer hitch receiver. At least one edge of each alphanumeric character is joined to an adjacent alphanumeric character to form a message. A front of the insert retainer is preferably formed as a portion of the rear of the message. The insert retainer and the message could also be separate pieces. The rear of the message would be attached to the front of the insert retainer. The front of the insert may or may not be covered.

Accordingly, it is an object of the present invention to provide a message insert for a trailer hitch receiver which does not require a back plate or support surface.

It is a further object of the present invention to provide a message insert for a trailer hitch receiver which uses less plastic than a prior art trailer hitch receiver message insert.

Finally, it is another object of the present invention to provide a message insert for a trailer hitch receiver which provides a message with 3-dimensional alphanumeric characters.

These and additional objects, advantages, features and benefits of the present invention will become apparent from the following specification.

DETAILED DESCRIPTION OF THE PREFERRED EMBODIMENTS

Figure 1:
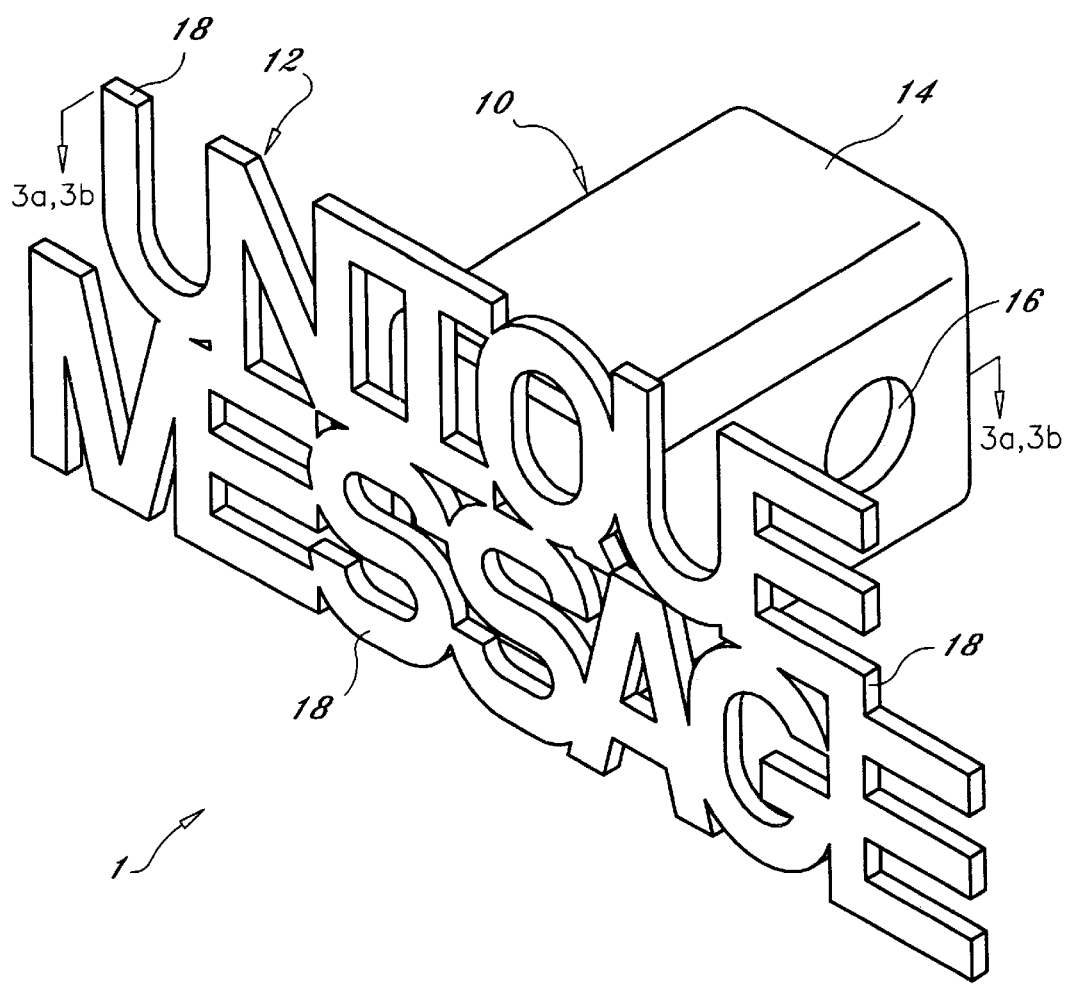
FIG. 1 is a perspective view of a message insert for a trailer hitch receiver in accordance with the present invention.
Figure 2:
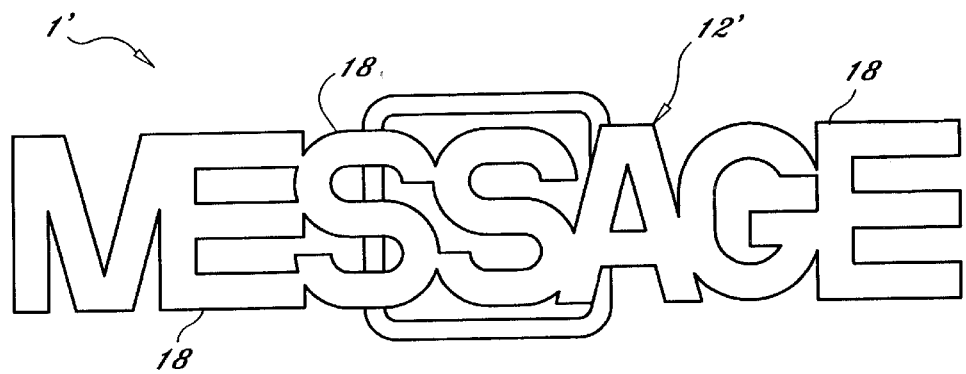
FIG. 2 is a front view of a message insert for a trailer hitch receiver in accordance with the present invention.
Figure 5:
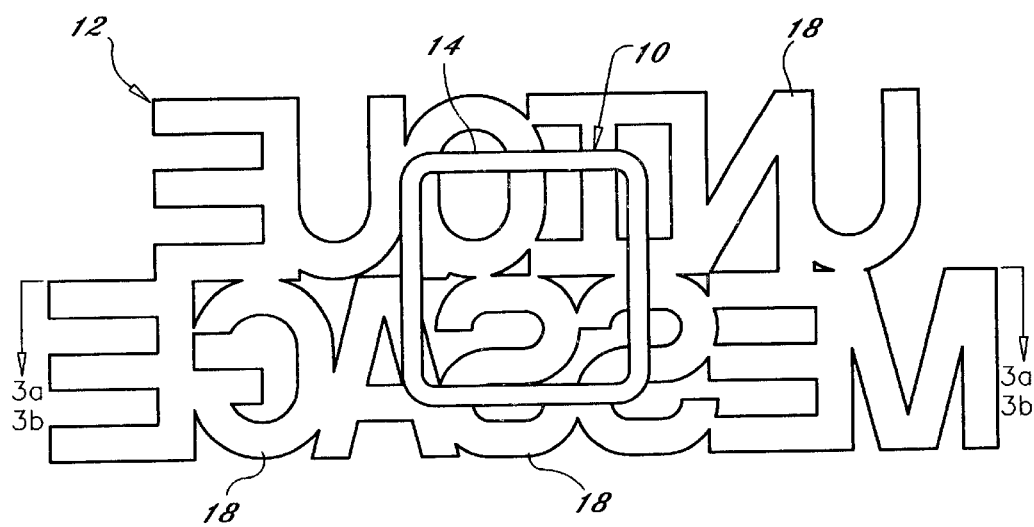
FIG. 5 is a rear view of a message insert for a trailer hitch receiver in accordance with the present invention.
Figure 2A:
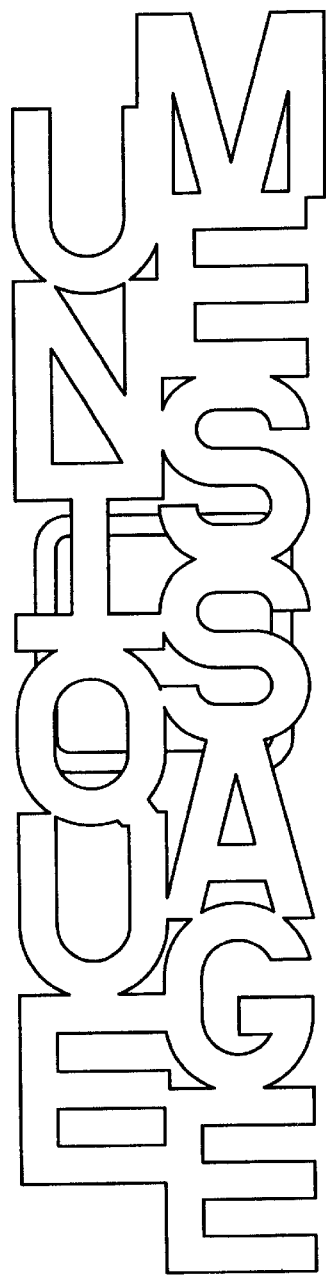
FIG. 2a is a front view of a message insert for a trailer hitch where the unique message is read in a vertical direction in accordance with the present invention.
Figure 4:
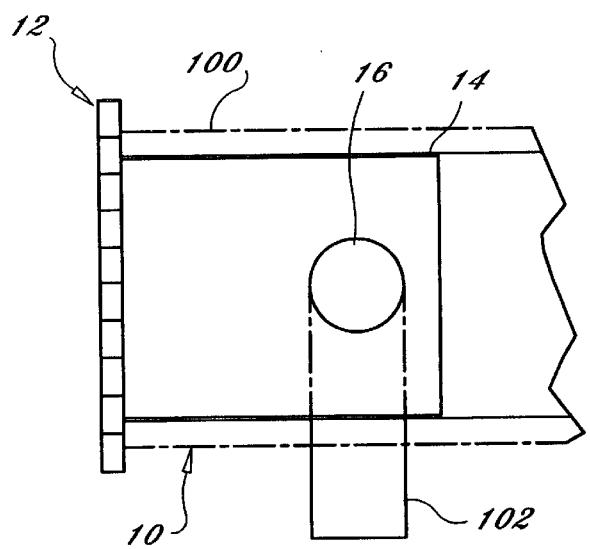
FIG. 4 is a side view of a message insert for a trailer hitch receiver inserted into a trailer hitch receiver in accordance with the present invention.

With reference now to the drawings, and particularly to FIG. 1, there is shown a perspective view of a message insert 1. With reference to FIGS. 4 and 5, the message insert 1 includes an insert retainer 10 and a series of alpha numeric characters 12. The definition of the word "series" is at least two alpha numeric characters. The series of alpha numeric characters 12 could be in two or more lines as shown in FIG. 1 or a single line as shown in FIG. 2. The alpha numeric characters may also be arranged in a vertical direction as shown in FIG. 2a, or at an angle relative to horizontal or vertical directions. The message insert 1 is preferably fabricated from a single plastic molding. However, the insert retainer 10 and the message 12 could also be separate pieces. If the insert retainer 10 and the message 12 were separate pieces, the rear of the message 12 would be attached to a front of the insert retainer 10 with sonic welding, adhesive or any other appropriate assembly method.

The insert retainer 10 preferably includes a rectangular tube body 14 which is sized to fit inside a trailer hitch receiver 100. A cross bore 16 is formed through an end of the insert retainer 10. The insert retainer 10 length is long enough to allow a retention pin 102 of the trailer hitch receiver 100 to be inserted through the cross bore 16. The retention pin 102 retains the message insert 1 relative to the trailer hitch receiver 100.

Figure 3A:
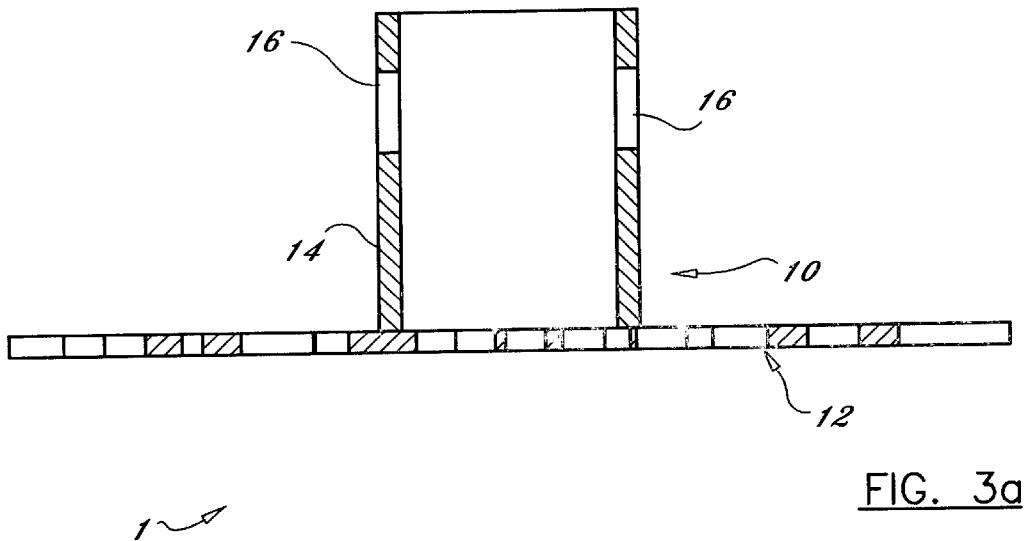
FIG. 3a is a top cross sectional view of a message insert for a trailer hitch receiver in accordance with the present invention.
Figure 3B:
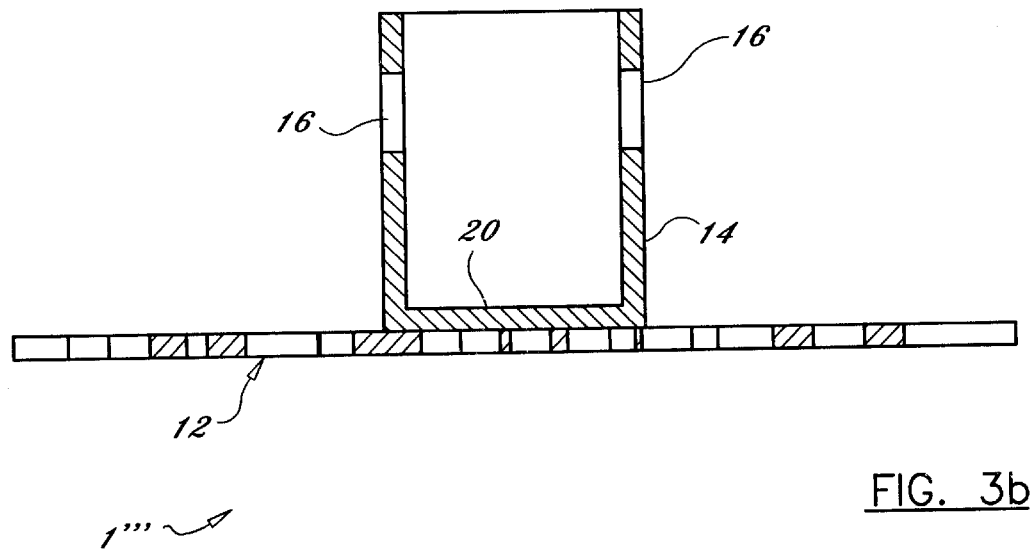
FIG. 3b is a top cross sectional view of a message insert for a trailer hitch receiver with a covered insert retainer in accordance with the present invention.

At least one edge of each alphanumeric character 18 is joined to at least one edge of an adjacent alphanumeric character 18 to form the message 12. In FIG. 3a, a front of the insert retainer 10 is molded to a rear of at least one alphanumeric character 18 of the message 12. In FIG. 3b, a cover 20 is molded at a front of the insert retainer 10. The cover 20 does not allow any foreign material to enter the trailer hitch receiver 100.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

I claim:

1. A message insert for a trailer hitch receiver comprising:

an insert retainer having an outside perimeter which sized to be inserted in to the trailer hitch receiver, a bore being formed through an end of said insert retainer, said bore being disposed such that a retainer pin may be inserted through said trailer hitch receiver and said bore to retain said insert retainer relative to said trailer hitch; and a series of alphanumeric characters, each said alphanumeric character being joined to an adjacent alphanumeric character on at least one edge thereof, the joinder of said series of alphanumeric characters on said at least one edge thereof being the sole support for said series of alphanumeric characters, said series of alphanumeric characters being free from back support, a rear of at least one alphanumeric character of said series of alphanumeric characters being attached to a front of said insert retainer.

2. The message insert for a trailer hitch receiver of claim 1, further comprising:
at least one additional series of alphanumeric characters being attached to said series of alphanumeric characters.

3. The message insert for a trailer hitch receiver of claim 1, further comprising:
a cover being formed on a front of said insert retainer.

4. The message insert for a trailer hitch receiver of claim 1, wherein:
said insert retainer being a rectangular tube.

5. The message insert for a trailer hitch receiver of claim 1, wherein:
said insert retainer and said series of alphanumeric characters being fabricated from a single plastic molding.

6. A message insert for a trailer hitch receiver comprising:
an insert retainer having an outside perimeter which sized to be inserted in to the trailer hitch receiver, a bore being formed through an end of said insert retainer, said bore being disposed such that a retainer pin may be inserted through said trailer hitch receiver and said bore to retain said insert retainer relative to said trailer hitch; and
a first series of alphanumeric characters being adjacent to each other, each said alphanumeric character being joined to an adjacent alphanumeric character on at least one edge thereof, at least one additional series of alphanumeric characters being attached to said first series of alphanumeric characters, the joinder of said series of alphanumeric characters on said at least one edge thereof being the sole support for said series of alphanumeric characters, said series of alphanumeric characters being free from back support, a rear of at least one alphanumeric character being attached to a front of said insert retainer.

7. The message insert for a trailer hitch receiver of claim 6, further comprising:
a cover being formed on a front of said insert retainer.

8. The message insert for a trailer hitch receiver of claim 6, wherein:
said insert retainer being a rectangular tube.

9. The message insert for a trailer hitch receiver of claim 6, wherein:
said insert retainer and said series of alphanumeric characters being fabricated from a single plastic molding.

10. A message insert for a trailer hitch receiver comprising:
an insert retainer having an outside perimeter which sized to be inserted in the trailer hitch receiver, a bore being formed through an end of said insert retainer, said bore being disposed such that a retainer pin may be inserted through said trailer hitch receiver and said bore to retain said insert retainer relative to said trailer hitch, a cover being formed on a front of said insert retainer; and
a first series of alphanumeric characters being adjacent to each other, each said alphanumeric character being joined to an adjacent alphanumeric character on at least one edge thereof, at least one additional series of alphanumeric characters being attached to said first series of alphanumeric characters, the joinder of said series of alphanumeric characters on said at least one edge thereof being the sole support for said series of alphanumeric characters, said series of alphanumeric characters being free from back support, a rear of at least one alphanumeric character being attached to a front of said insert retainer.

11. The message insert for a trailer hitch receiver of claim 10, wherein:
said insert retainer being a rectangular tube.

12. The message insert for a trailer hitch receiver of claim 10, wherein:
said insert retainer and said series of alphanumeric characters being fabricated from a single plastic molding.

* * * * *